United States Patent
Lee et al.

(10) Patent No.: US 10,234,620 B2
(45) Date of Patent: Mar. 19, 2019

(54) LIGHT GUIDE PLATE AND PLANER LIGHT SOURCE DEVICE HAVING THE SAME

(71) Applicant: LG ELECTRONICS INC., Seoul (KR)

(72) Inventors: Woosuk Lee, Seoul (KR); Guenhwan Kim, Seoul (KR); Juyoung Joung, Seoul (KR); Wondo Kee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/198,682

(22) Filed: Jun. 30, 2016

(65) Prior Publication Data

US 2017/0003439 A1   Jan. 5, 2017

(30) Foreign Application Priority Data

Jul. 1, 2015   (KR) .................. 10-2015-0094236

(51) Int. Cl.

| | | |
|---|---|---|
| F21V 7/04 | (2006.01) | |
| F21V 8/00 | (2006.01) | |
| G02F 1/1368 | (2006.01) | |
| G02F 1/1335 | (2006.01) | |

(52) U.S. Cl.
CPC ......... *G02B 6/0058* (2013.01); *G02B 6/0003* (2013.01); *G02B 6/0046* (2013.01); *G02B 6/0061* (2013.01); *G02F 1/1368* (2013.01); *G02F 1/133514* (2013.01); *G02B 6/0036* (2013.01); *G02B 6/0041* (2013.01); *G02B 6/0043* (2013.01); *G02B 6/0051* (2013.01); *G02B 6/0053* (2013.01); *G02B 6/0055* (2013.01); *G02B 6/0065* (2013.01); *G02B 6/0088* (2013.01)

(58) Field of Classification Search
USPC ....................................... 362/606
See application file for complete search history.

(56) References Cited

U.S. PATENT DOCUMENTS

| | | | | |
|---|---|---|---|---|
| 2007/0025098 A1* | 2/2007 | Kim | ............... | G02B 6/0043 362/97.3 |
| 2007/0153548 A1* | 7/2007 | Hamada | ............... | G02B 6/0036 362/615 |
| 2009/0034230 A1* | 2/2009 | Lim | ............... | G02B 6/0028 362/84 |
| 2009/0034292 A1* | 2/2009 | Pokrovskiy | ......... | G02B 6/0028 362/617 |

(Continued)

FOREIGN PATENT DOCUMENTS

| | | |
|---|---|---|
| CN | 104459873 A | 3/2015 |
| JP | 2002-358812 A | 12/2002 |
| WO | 2009-017794 A1 | 2/2009 |

*Primary Examiner* — Tuyen K Vo
(74) *Attorney, Agent, or Firm* — Dentons US LLP

(57) ABSTRACT

A light guide plate includes a light introduction surface to receive light supplied from a light source module and a light emission surface to emit the light outward, the light emission surface having a larger area than the light introduction surface. The light guide plate is of a material that transmits light and absorbs light in an absorption wavelength band. The light guide plate further includes a plurality of color patterns to convert the light supplied from the light source module into light in the absorption wavelength band.

5 Claims, 16 Drawing Sheets

(56) References Cited

U.S. PATENT DOCUMENTS

| | | | | |
|---|---|---|---|---|
| 2009/0316072 A1* | 12/2009 | Okumura | ............... | G02B 5/021 |
| | | | | 349/64 |
| 2010/0188613 A1* | 7/2010 | Tsukahara | ............ | G02B 6/0023 |
| | | | | 349/69 |
| 2010/0253880 A1* | 10/2010 | Sasaki | ................. | G02B 6/0038 |
| | | | | 349/64 |
| 2012/0327685 A1* | 12/2012 | Song | .................... | G02B 6/0036 |
| | | | | 362/607 |
| 2013/0051075 A1* | 2/2013 | Fujita | .................. | G02B 6/0038 |
| | | | | 362/613 |
| 2014/0132889 A1* | 5/2014 | Li | ......................... | G02B 6/005 |
| | | | | 349/65 |
| 2014/0307465 A1* | 10/2014 | Choi | ................ | G02F 1/133615 |
| | | | | 362/606 |
| 2015/0062490 A1* | 3/2015 | Kwon | ............... | G02F 1/133621 |
| | | | | 349/64 |
| 2015/0369989 A1* | 12/2015 | Hsu | ...................... | G02B 6/0073 |
| | | | | 349/65 |
| 2016/0116663 A1* | 4/2016 | Hong | .................. | G02B 6/0053 |
| | | | | 362/607 |
| 2016/0161661 A1* | 6/2016 | Cho | .................. | G02F 1/133615 |
| | | | | 362/606 |

\* cited by examiner

LIGHT GUIDE PLATE AND PLANER LIGHT SOURCE DEVICE HAVING THE SAME

CROSS-REFERENCE TO RELATED APPLICATION

This application claims the priority benefit of Korean Patent Application No. 10-2015-0094236, filed on Jul. 1, 2015 in the Korean Intellectual Property Office, which is incorporated by reference for all purposes as if fully set forth herein.

BACKGROUND

Field

Embodiments disclosed relate to a light guide plate and a planar light source device.

Description of the Related Art

A representative example of light-emitting elements is Light-Emitting Diodes (LEDs), which convert electrical signals into infrared light, visible light, and the like using the characteristics of compound semiconductors. LEDs are used in, for example, home appliances, remote controllers, electronic display boards, display devices, and various automation devices. The fields in which LEDs are used are gradually becoming more numerous.

A planar light source device equipped with LEDs is a device that converts light, which is emitted in a point light source form from LEDs, into a planar light form. The planar light source device may be used in a display apparatus such as a liquid crystal display apparatus, and may be used in a variety of lighting apparatuses.

In a conventional light guide structure, light is introduced from a light source, located at one side when viewing a cross-section of a light guide unit, into the light guide unit so as to be guided to a light emission surface or a surface opposite to the light source. A light guiding means is a total reflection or light emission means based on the difference in the index of refraction, and this means uses a pattern or shape to cause light to be emitted from the light emission surface.

Referring to FIG. 16, there are arranged a light guide plate 300, which has a light introduction surface 310 located at one side surface, and a light source module 200 adjacent to the light introduction surface 310 of the light guide plate 300.

Here, light, provided from the light source module 200, is introduced into the light introduction surface 310 to thereby undergo total reflection and diffusion inside the light guide plate 300.

At this time, the light guide plate 300 is generally formed of a transparent material which has a higher index of refraction than air. However, the transparent light guide plate 300 absorbs some of the light, having a given wavelength, from the light source module 200. Thus, the light emitted from the light source module 200 is changed in color by passing through the light guide plate 300. In particular, the light emitted from the light guide plate 300 is gradually changed in color with increasing distance from the light source module 200.

In recent years, a glass material having good transparency and rigidity is used as the material for the light guide plate 300. When white light from the light source module 200 is introduced into the glass material, the glass material absorbs bluish light (in a wavelength band from 400 nm to 440 nm). Thus, the light guide plate 300, which is distant from the light source module 200, may problematically emit light in which a yellow color is intensified.

In the case where a planar light source device emits other colors of light, rather than emitting white light, the liquid crystal display apparatus employing the planar light source device suffers from the problem of color deviation.

SUMMARY

Embodiments include a light guide plate and a planar light source device, which achieve enhanced light introduction efficiency and reduced color deviation.

In one embodiment, a light guide plate includes a light introduction surface to receive light supplied from a light source module; a light emission surface to emit the light outward, the light emission surface having a larger area than the light introduction surface; and a plurality of color patterns to convert the light into light in an absorption wavelength band, wherein the light guide plate is of a material that transmits light and absorbs light in the absorption wavelength band.

In another embodiment, a planar light source device includes a light source module to supply light; a light guide plate including a light introduction surface to receive the light from the light source module and a light emission surface to emit the light outward, the light emission surface having a larger area than the light introduction surface; and a plurality of color patterns to convert a wavelength of the light in the light guide plate, wherein the light guide plate is of a material that transmits light and absorbs light in an absorption wavelength band, and wherein the color patterns convert the light supplied from the light source module into light in the absorption wavelength band.

BRIEF DESCRIPTION OF THE DRAWINGS

Details of the embodiments will be more clearly understood from the following detailed description taken in conjunction with the accompanying drawings, in which.

DETAILED DESCRIPTION OF EMBODIMENTS

Figure 1:
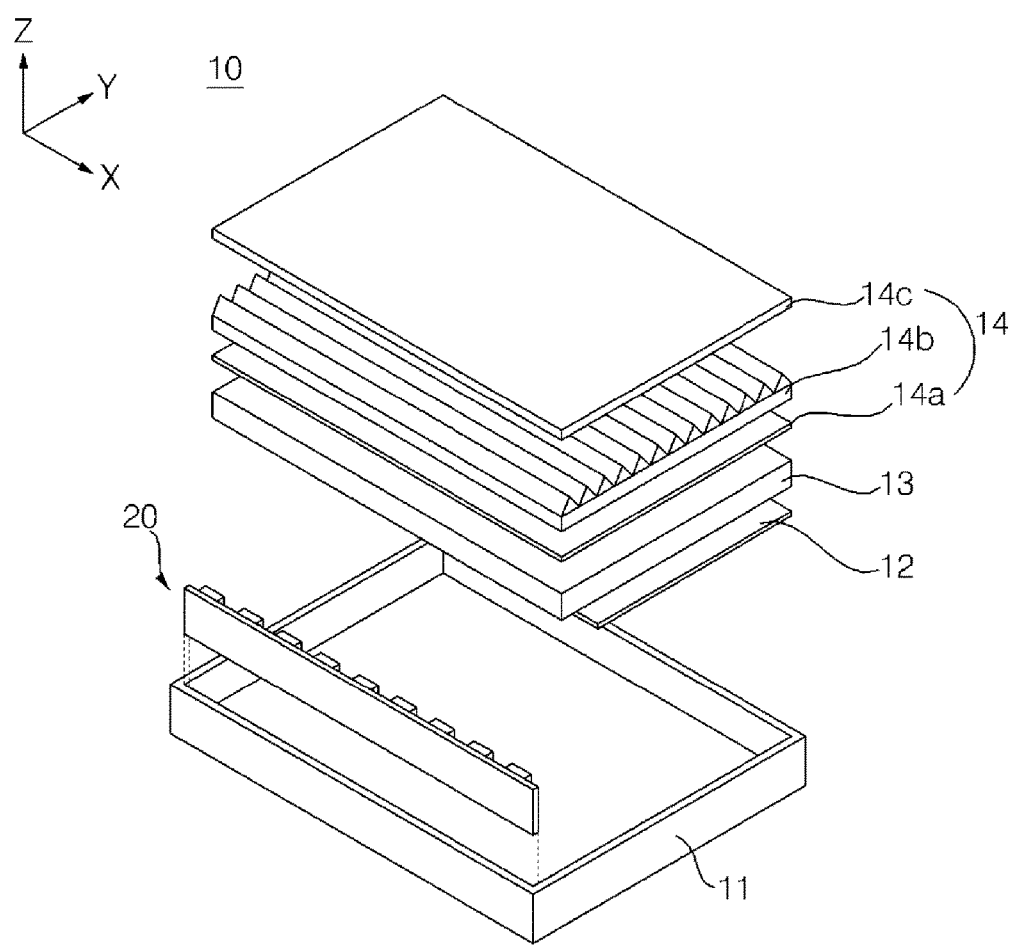
FIG. 1 is an exploded perspective view illustrating a planar light source device according to a first embodiment.

Reference will now be made in detail to embodiments, examples of which are illustrated in the accompanying drawings. However, the present disclosure may be embodied in many different forms and should not be construed as limited to the embodiments set forth herein. Rather, these embodiments are provided so that this disclosure will be thorough and complete, and will fully convey the scope of the disclosure to those skilled in the art. The present disclosure is defined only by the categories of the claims. In certain embodiments, detailed descriptions of device constructions or processes well known in the art may be omitted to avoid obscuring appreciation of the disclosure by a person of ordinary skill in the art. Wherever possible, the same reference numbers will be used throughout the drawings to refer to the same or like parts.

Spatially-relative terms such as "below", "beneath", "lower", "above", or "upper" may be used herein to describe one element's relationship to another element as illustrated in the Figures. It will be understood that spatially-relative terms are intended to encompass different orientations of the device in addition to the orientation depicted in the Figures. For example, if the device in one of the figures is turned over, elements described as "below" or "beneath" other elements would then be oriented "above" the other elements. The exemplary terms "below" or "beneath" can, therefore, encompass both an orientation of above and below. Since the device may be oriented in another direction, the spatially-relative terms may be interpreted in accordance with the orientation of the device.

The terminology used in the present disclosure is for the purpose of describing particular embodiments only and is not intended to limit the disclosure. As used in the disclosure and the appended claims, the singular forms "a", "an" and "the" are intended to include the plural forms as well, unless context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

In the drawings, the thickness or size of each layer is exaggerated, omitted, or schematically illustrated for convenience of description and clarity. Also, the size or area of each constituent element does not entirely reflect the actual size thereof.

Angles or directions used to describe the structures of light emitting devices according to embodiments are based on those shown in the drawings. Unless there is, in the specification, no definition of a reference point to describe angular positional relations in the structures of the light emitting devices, the associated drawings may be referred to.

Figure 2:
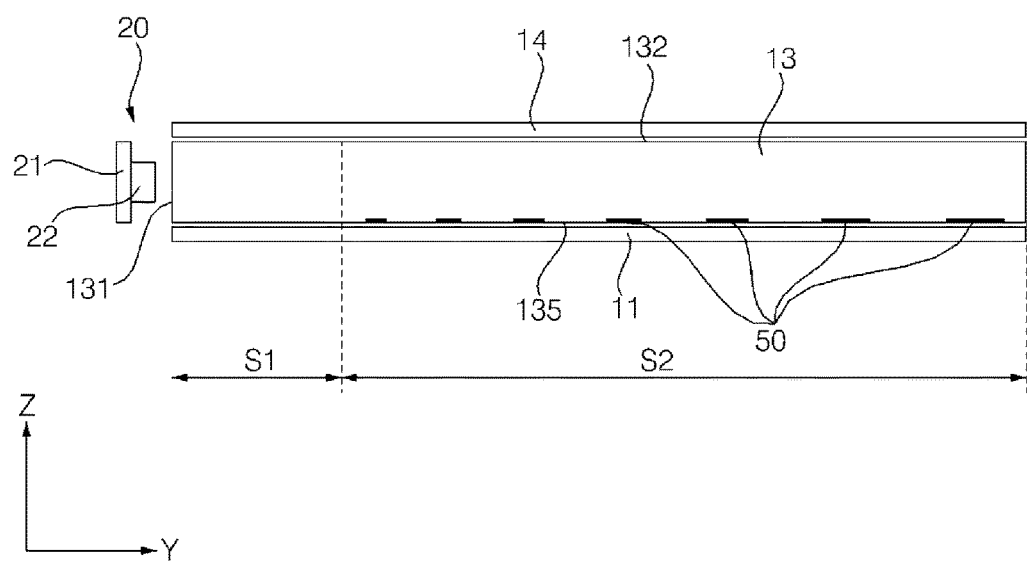
FIG. 2 is a sectional view illustrating the planar light source device according to the first embodiment.
Figure 3:
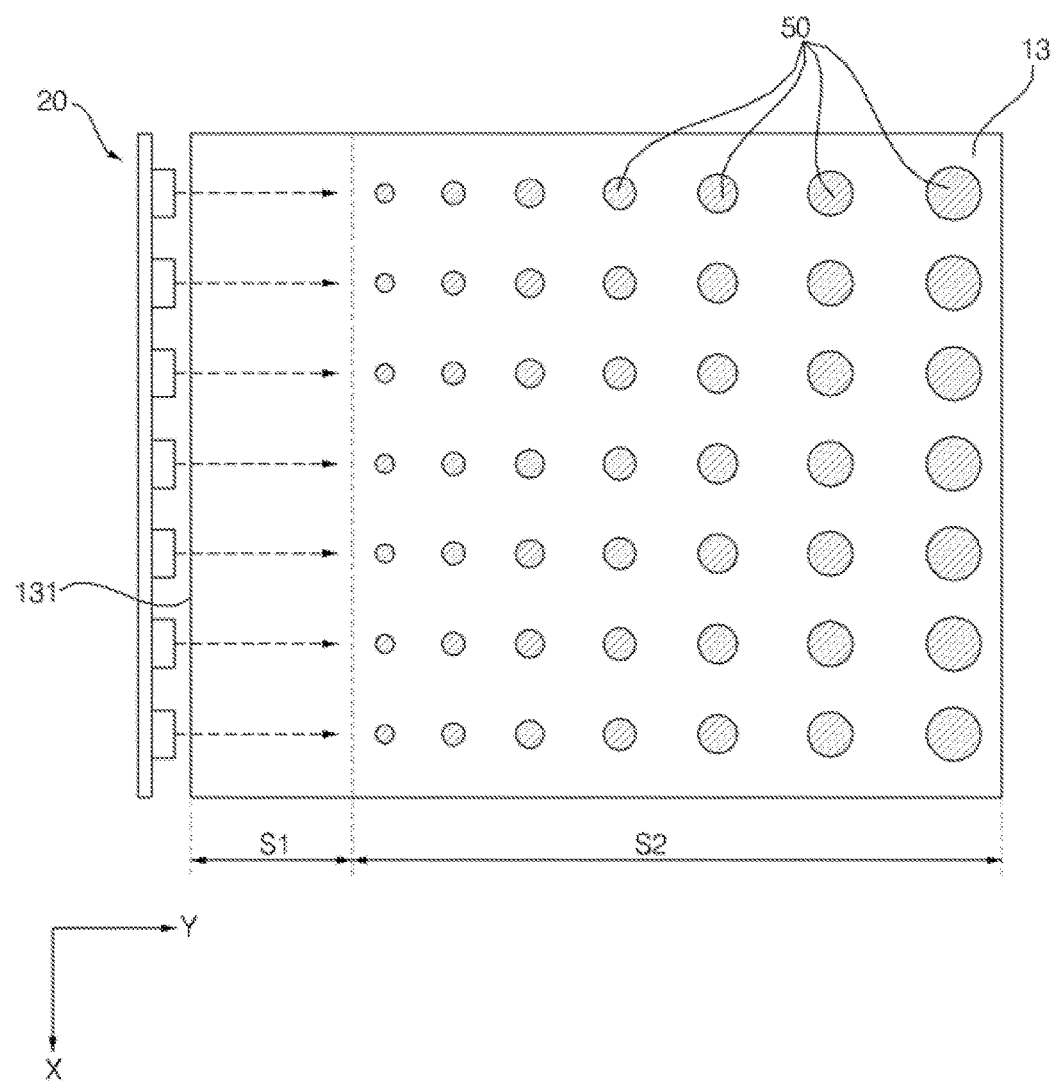
FIG. 3 is a plan view illustrating the planar light source device according to the first embodiment.

FIG. 1 is an exploded perspective view illustrating a planar light source device according to a first embodiment, FIG. 2 is a sectional view illustrating the planar light source device according to the first embodiment, and FIG. 3 is a plan view illustrating the planar light source device according to the first embodiment.

Referring to FIGS. 1 and 2, the planar light source device 10 of the first embodiment includes a light source module 20 to provide light, a light guide plate 13 having a light introduction surface 131 to receive light from the light source module 20 and a light emission surface 132 to emit the light, the light emission surface 132 having a larger area than the light introduction surface 131, and a plurality of color patterns 50 to convert the wavelength of introduced light.

First, the Z-axis illustrated in the drawings may be referred to as "the front". The X-axis illustrated in the drawings may be referred to as "the longitudinal direction". The Y-axis illustrated in the drawings may be referred to as "the horizontal direction" or "the light traveling direction".

The light source module 20 generates light and provides the light to the light guide plate 13. Specifically, the light source module 20 is located adjacent to the light introduction surface 131 of the light guide plate 13 in order to provide the light to the light introduction surface 131. More specifically, the light source module 20 provides white light to the light guide plate 13.

For example, the light source module 20 includes a plurality of point light sources 22 which generates light, and a circuit board 21 on which the point light sources 22 are placed.

The point light sources 22 may include all means configured to generate light. For example, the point light sources 22 mean light sources that emit light in the form of points. The point light sources 22 may include semiconductor diodes such as, for example, light-emitting diodes or laser diodes.

Specifically, as exemplarily illustrated in FIG. 2, the point light sources 22 may be implemented in a chip-on-board type in which light-emitting diodes are mounted on the circuit board 21. However, the disclosure is not limited thereto.

In addition, although the point light sources 22 may be colored light-emitting diodes which emit red, green, blue, or white light, or ultraviolet light-emitting diodes which emit ultraviolet light, the disclosure is not limited thereto. In addition, the light source module 20 may further include phosphors (not illustrated) which convert the wavelength of light, generated from the point light sources 22, into a white-based wavelength. The phosphors are located to surround the perimeter of the point light sources 22.

In addition, the point light sources 22 may be arranged in a single row or multiple rows. Specifically, the point light sources 22 may be configured such that light-emitting elements, which emit red, green, or blue light, are alternately arranged.

Specifically, the point light sources 22 are repeatedly arranged at a constant pitch in the longitudinal direction (the X-axis) of the light introduction surface 131 of the light guide plate 13. The point light sources 22 may be arranged in a single row in the direction parallel to the longitudinal direction of the light introduction surface 131 of the light guide plate 13.

Light from the point light sources 22 is emitted in a radial shape (fan shape) on the basis of the light emission direction. The light emission direction of the point light sources 22 is generally perpendicular to the light introduction surface 131.

The circuit board 21 provides a space, in which the point light sources 22 are located, and supports the point light sources 22. The circuit board 21, for example, may include an electrically conductive electrode pattern (not illustrated), and an electrically insulating body configured to surround the electrode pattern and having an opening (not illustrated) through which one region of the electrode pattern is exposed.

The circuit board 21 may be a general Printed Circuit Board (PCB), a metal core PCB, a flexible PCB, or a ceramic PCB, for example.

The circuit board 21 is disposed to face the light introduction surface 131 of the light guide plate 13. Specifically, the circuit board 21 is disposed to face, in parallel, to the light introduction surface 131 of the light guide plate 13. In addition, the size of the circuit board 21 is at least as large as the size of the light introduction surface 131 of the light guide plate 13. That is, the circuit board 21 is located so as to at least cover the light introduction surface 131 of the light guide plate 13.

A surface of the circuit board 21 facing the light introduction surface 131 may be provided with a reflector layer (not illustrated) to reflect light. For example, the reflector layer may be formed by applying a reflective material to the entire upper surface of the circuit board 21.

For example, the reflector layer may comprise at least one of silver (Ag), aluminum (Al), a silver (Ag) alloy, and an aluminum (Al) alloy. In another example, the reflector layer may be configured such that layers having different indices of refraction are alternately and repeatedly stacked one above another. However, the reflector layer is not limited thereto.

At this time, the point light sources 22 are arranged in the longitudinal direction of the circuit board 21 (the X-axis, i.e. the longitudinal direction of the light introduction surface 131).

The light guide plate 13 serves to diffuse and propagate the light introduced from the light source module 20. That is, the light guide plate 13 may cause introduced point light to have even brightness, and may convert the introduced point light into planar light so that the planar light is emitted outward through the light emission surface 132.

For example, the light guide plate 13 is formed of a transparent material into which light propagates. Specifically, the light guide plate 13 may be fabricated and used in a flat type or a wedge type using polymethylmethacrylate (PMMA) or a transparent acryl resin, may be formed of a glass material, or may include a plastic lens, although the disclosure is not limited thereto.

When light passes through the light guide plate 13, the light guide plate 13 absorbs light in a prescribed absorption wavelength band according to the characteristics of respective materials. Specifically, in the case where the light guide plate 13 is formed of a glass material having good rigidity and transparency, the light guide plate 13 absorbs light in a blue range (a wavelength band from 400 nm to 440 nm). The efficiency with which the light guide plate 13 absorbs a specific wavelength is proportional to the distance along which the light passes.

In particular, referring to FIG. 2, the light guide plate 13 may take the form of a plate having the light emission surface 132, from which planar light is emitted, a rear surface 135 opposite to the light emission surface 132, and a side surface connecting the light emission surface 132 and the rear surface 135 to each other. However, the form of the light guide plate 13 is not limited thereto. In addition, in another embodiment, light may be emitted from the front and rear sides of the light guide plate 13 (both ends in the Z-axis).

The rear surface 135 of the light guide plate 13 performs forward (Z-axis) total reflection of the light introduced through the light introduction surface 131 from the point light sources 22. In particular, the rear surface 135 performs total reflection using the difference in the index of refraction between the light guide plate 13 and the outside.

For example, light-scattering patterns (not illustrated) to scatter introduced light may be located at some positions of the rear surface 135. The light-scattering patterns may be a plurality of bosses protruding inward from the rear surface 135. In addition, a reflective material and color patterns 50 on the reflective material may overlap the light-scattering patterns.

The front surface of the light guide plate 13, i.e. the light emission surface 132 is forwardly spaced apart from the rear surface 135. The light emission surface 132 and the rear surface 135 are arranged parallel to each other in consideration of the efficient propagation of light.

Specifically, the light emission surface 132 may include a regular reflector pattern. The light emission surface 132 may downwardly reflect some of the light introduced through the light introduction surface 131 from the point light sources 22 so as to transmit the light in the direction opposite to the light introduction surface 131. The remaining light, introduced through the light introduction surface 131 from the point light sources 22, may be forwardly emitted from the light guide plate 13 through the light emission surface 132.

The light introduction surface 131 is a space which is located between the rear surface 135 and the light emission surface 132 to receive light from the point light sources 22 of the light source module 20.

For example, as exemplarily illustrated in FIG. 2, the light introduction surface 131 may be a transparent material disposed on one side surface of the light guide plate 13. In particular, the area of the light introduction surface 131 is smaller than the area of the light emission surface 132.

As such, the light guide plate 13 is formed of a light transmissive material, and is configured to inwardly propagate the light introduced through the light introduction surface 131 using the difference in the index of refraction between the light guide plate 13 and the outside. The light introduction surface 131, the rear surface 135, and the light emission surface 132 of the light guide plate 13 define the outer surface of the light guide plate 13.

In addition, the planar light source device 10 may further include at least one optical sheet 14 disposed in front of the light guide plate 13 to concentrate and diffuse the light directed from the light guide plate 13, and at least one reflector sheet 12 at the rear of the light guide plate 13.

In addition, the planar light source device 10 may further include a bottom cover 11 disposed below the light guide plate 13, the bottom cover 11 being configured to receive the light guide plate 13 and the light source module 20 therein.

Although the reflector sheet 12 may be disposed at the rear of the light guide plate 13, the disclosure is not limited thereto. The reflector sheet 12 may enhance light transmission efficiency by reflecting the light, generated from the light source module 20, toward the light emission surface 132 of the light guide plate 13.

The optical sheet 14 serves to concentrate and diffuse the planar light directed from the light guide plate 13. For example, the optical sheet 14 may include a diffuser film 14a which includes diffuser particles such as, for example, beads to diffuse the light directed from the light guide plate 13 toward a liquid crystal display panel (in the forward direction), a prism film 14b which has a prism pattern to concentrate light in front of the diffuser film 14a, and a protector film 14c which covers the entire surface of the prism film 14b to protect the prism film 14b. However, the disclosure is not limited thereto.

The optical sheet 14 may diffuse and concentrate the light, emitted from the light source module 20 and guided by the light guide plate 13, so as to achieve the required brightness and view angle.

The diffuser film 14a may achieve even brightness by scattering and concentrating the light from the light source module 20, or the light returning from the prism film 14b. The diffuser film 14a may have a thin sheet shape and may be formed of a transparent resin. For example, the diffuser film 14a may be formed by coating a polycarbonate or polyester film with a light-scattering or light-concentrating resin. However, the disclosure is not limited thereto.

The prism film 14b is acquired by forming a vertical or horizontal prism pattern on the surface of an optical film, and serves to concentrate light output from the diffuser film 14a.

The prism pattern of the prism film 14b may be formed to have a triangular cross section in order to improve the light concentration efficiency thereof. The best brightness may be accomplished when a right-angled prism having an apex angle of 90 degrees is used.

The protector film 14c may cover the upper surface of the prism film 14b in order to protect the prism film 14b.

The color patterns 50 emit light in a wavelength band absorbed by the light guide plate 13 so as to reduce color deviation generated in the light guide plate 13.

The color patterns 50 convert the wavelength of the light introduced through the light guide plate 13. Specifically, the color patterns 50 convert the light, directed from the light guide plate 13, into light in an absorption wavelength band of the light guide plate 13.

For example, the color patterns 50 include phosphors which convert the light provided from the light guide plate 13 into light of a specific wavelength range and provide the converted light to the light guide plate 13. The phosphors may be selected based on the wavelength of the light having passed through the light guide plate 13 so as to realize white light at the light emission surface 132 of the light guide plate 13.

The phosphors may be any one selected, based on the wavelength of light, from among blue light emission phosphors, blue-green light emission phosphors, green light emission phosphor, yellow-green light emission phosphors, yellow light emission phosphors, yellow-red light emission phosphors, orange light emission phosphors, and red light emission phosphors.

That is, the phosphors may be excited by light having a first color provided from the light guide plate 13 to thereby generate light having a second color. For example, when the light provided from the light guide plate 13 is blue light and the phosphors are yellow phosphors, the yellow phosphors may be excited by the blue light to thereby emit yellow light. As the blue light provided from the light guide plate 13 and the yellow light generated from the phosphors excited by the blue light are mixed with each other, white light may be provided to the light emission surface 132 of the light guide plate 13.

Similarly, the case where magenta phosphors or blue and red phosphors are mixed when green light is provided from the light guide plate 13, and the case where cyan phosphors or blue and green phosphors are mixed when red light is provided from the light guide plate 13 may be exemplary.

The phosphors may be known phosphors such as, for example, YAG-based, TAG-based, sulfide-based, silicate-based, aluminate-based, nitride-based, carbide-based, nitridosilicate-based, borate-based, fluoride-based, and phosphate-based phosphors.

For example, the color patterns 50 include phosphors which convert the light provided from the light guide plate 13 into light in a blue range to thereby provide the converted light to the light guide plate 13.

In another example, since the absorption rate of light provided from the light source module 20 increases in proportion to the distance that the light passes through the light guide plate 13, the color of phosphors distant from the light source module 20 may differ from the color of phosphors close to the light source module 20.

The color patterns 50 may be arranged at various positions so as to convert the wavelength of the light provided from the light guide plate 13.

For example, the color patterns 50 are located on the light guide plate 13. However, the positions of the color patterns 50 are not limited to the exterior of the light guide plate 13, and the color patterns 50 may be located at various other positions. This will be described below.

Specifically, the color patterns 50 are located at the interior, the inner surface, and/or the outer surface of the light guide plate 13. The color patterns 50 need to convert the light emitted from the light emission surface 132, and thus are located on the rear surface 135 opposite to the light emission surface 132. In particular, as exemplarily illustrated in FIG. 3, when viewed from the front, the color patterns 50 are arranged in a random or regular manner on the rear surface 135.

The light guide plate 13 further includes a color deviation region S2 spaced apart from the light source module 20 by a prescribed distance. The color deviation region S2 is one region of the light guide plate 13 that includes the region spaced apart from the light source module 20 by a predetermined distance or more. Specifically, as exemplarily illustrated in FIGS. 2 and 3, when the light source module 20 is located close to one side surface of the light guide plate 13, i.e. the light introduction surface 131, the color deviation region S2 is one region of the light guide plate 13, located distant from the light source module 20, among cross-sectional regions cut in the longitudinal direction (the X-axis) of the light guide plate 13. At this time, the remaining region of the light guide plate 13, excluding the color deviation region S2, is a general region S1.

At this time, the color patterns 50 are located in the color deviation region S2 in which color deviation occurs because the distance that the light provided from the light source module 20 passes through the light guide plate 13 increases.

The color patterns 50 may have various shapes to attain a prescribed area when viewed from the front of the light guide plate 13. The color patterns 50 may be at least one of circles, ovals, and polygons. Specifically, the color patterns 50 may have different shapes, or the color patterns 50 having various shapes may be arranged in a random manner.

The light guide plate 13 absorbs more light in the absorption wavelength band as the distance from the light source module 20 increases. Therefore, the density of the color patterns 50 increases with increasing distance from the light introduction surface 131 of the light guide plate 13. In addition, the density of the color patterns 50 increases with increasing distance from the light source module 20.

Here, "density" means the area of the color patterns 50 per unit area of the light guide plate 13 when viewed from the front. Specifically, as exemplarily illustrated in FIG. 3, the color patterns 50 are arranged so as to increase in size with increasing distance from the light introduction surface 131 of the light guide plate 13. At this time, the pitch between the color patterns 50 is the same.

In this way, the color deviation of the light emitted from the light emission surface 132 of the light guide plate 13 is improved.

Figure 4:
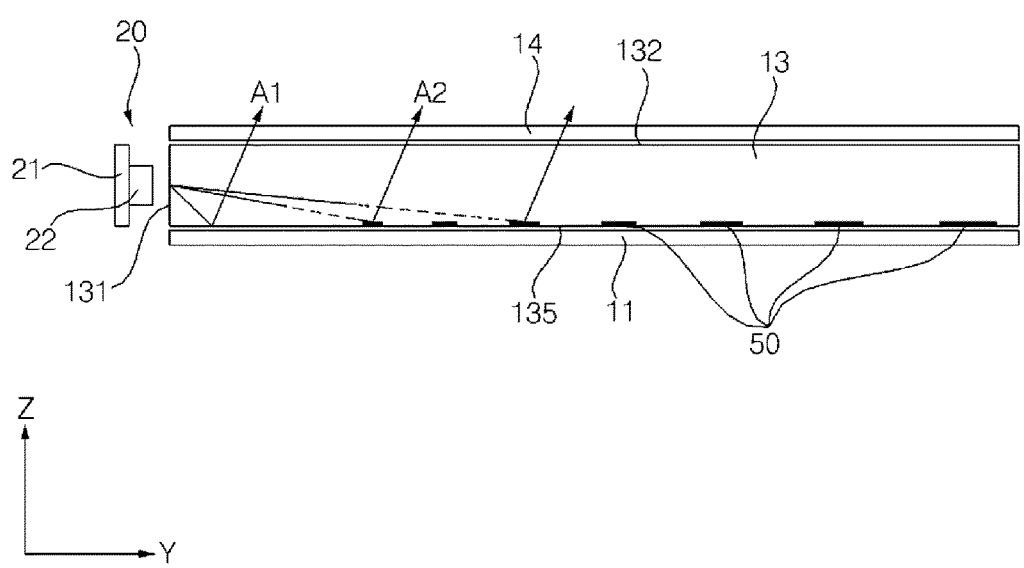
FIG. 4 is a reference view to explain the light traveling path of the planar light source device.

FIG. 4 is a reference view to explain the light traveling path of the planar light source device.

Referring to FIG. 4, first light A1, among the light introduced from the light source module 20, undergoes total reflection by one region of the rear surface 135 close to the light introduction surface 131 to thereby be emitted through the light emission surface 132. The distance that the light A1 passes through the light guide plate 13 is relatively short, and therefore no color conversion occurs.

Second light A2, among the light introduced from the light source module 20, undergoes total reflection by another region of the rear surface 135, which is relatively distant from the rear light introduction surface 131 to thereby be emitted through the light emission surface 132. Although color conversion occurs because the distance that the light A1 passes through the light guide plate 13 is relatively long, the color of the light is again converted into a color corresponding to a wavelength similar to that of the first light A1 by the color patterns 50. In this way, white light is provided as the first light A1 and the second light A2 are mixed with each other on the light emission surface 132.

Figure 5:
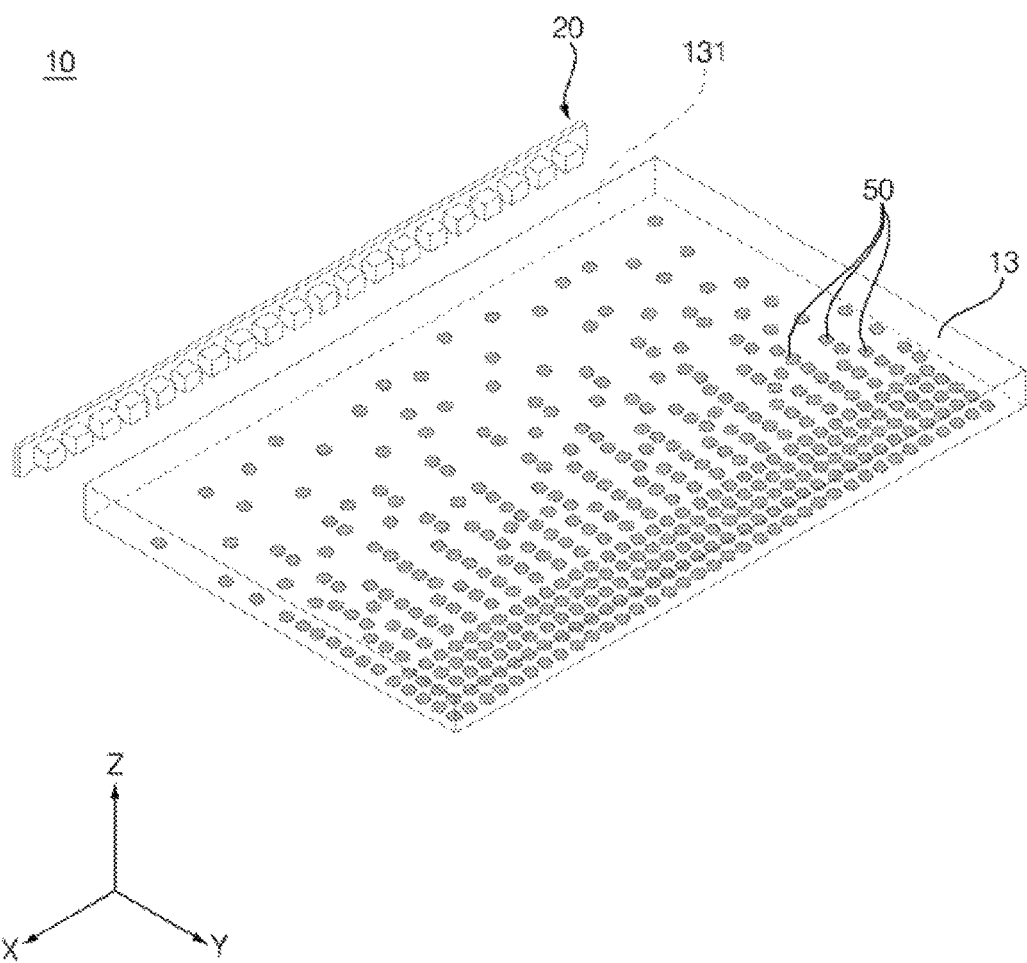
FIG. 5 is a perspective view illustrating the planar light source device according to a second embodiment.

FIG. 5 is a perspective view illustrating the planar light source device according to a second embodiment.

Referring to FIG. 5, the planar light source device of the second embodiment differs from that of the first embodiment in terms of the arrangement and size of the color patterns 50.

The density of the color patterns 50 according to the second embodiment increases with increasing distance from the light introduction surface 131 of the light guide plate 13 (or the light source module 20). Specifically, all of the color patterns 50 have the same size, and the pitch between the color patterns 50 decreases with increasing distance from the light source module 20. The color patterns 50 are densely arranged as the distance from the light introduction surface 131 increases.

Figure 6:
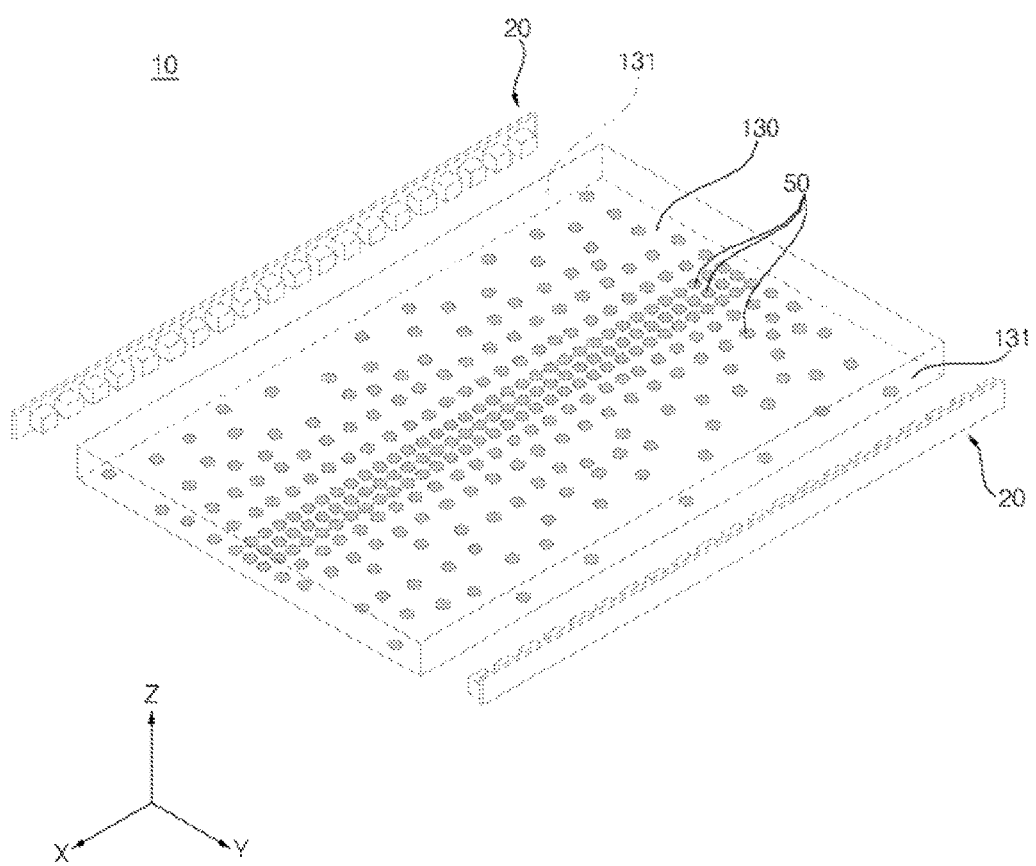
FIG. 6 is a perspective view illustrating the planar light source device according to a third embodiment.

FIG. 6 is a perspective view illustrating the planar light source device according to a third embodiment.

Referring to FIG. 6, the planar light source device of the third embodiment differs from that of the second embodiment in terms of the arrangement of the light source module 20 and the arrangement of the color patterns 50.

Two light source modules 20 are arranged adjacent to opposite side surfaces of the light guide plate 13. At this time, the light source modules 20 provide light to both side surfaces of the light guide plate 13, and thus light introduction surfaces 131 are located at the side surfaces of the light guide plate 13. Light introduced into the light introduction surfaces 131 of the light guide plate 13 is diffused to the center of the light guide plate 13.

The density of the color patterns 50 according to the third embodiment increases with increasing distance from the light introduction surface 131 of the light guide plate 13 (or the light source module 20). Specifically, all of the color patterns 50 have the same size, and the pitch between the color patterns 50 decreases with increasing distance from each light source module 20. The color patterns 50 are densely arranged as the distance from each light introduction surface 131 increases. More specifically, the color patterns 50 are densely arranged with increasing distance from the side surfaces of the light guide plate 13 and decreasing distance from the center of the light guide plate 13.

Figure 7:
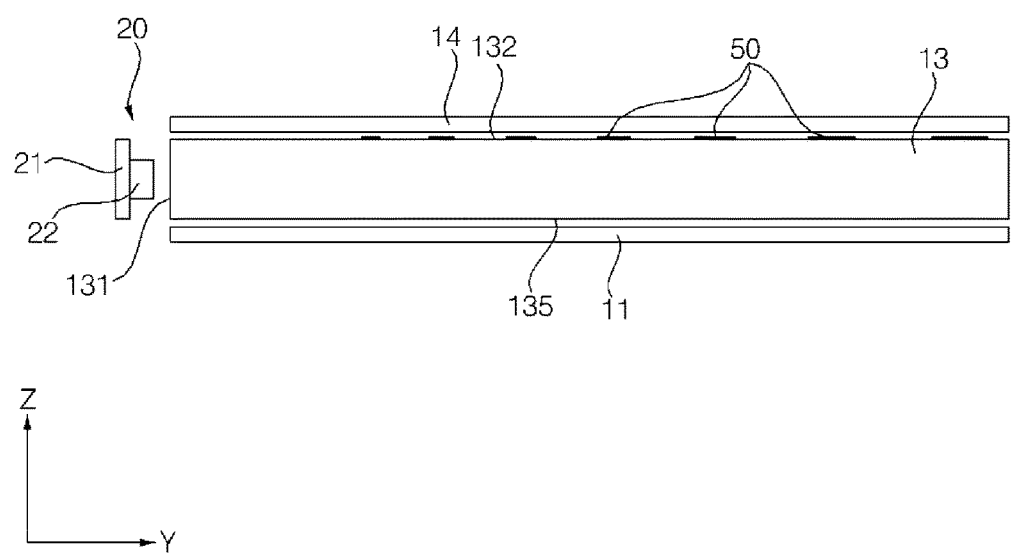
FIG. 7 is a sectional view illustrating the planar light source device according to a fourth embodiment.

FIG. 7 is a sectional view illustrating the planar light source device according to a fourth embodiment.

Referring to FIG. 7, the planar light source device of the fourth embodiment differs from that of the first embodiment in terms of the positions of the color patterns 50.

The color patterns 50 of the fourth embodiment are located on the light emission surface 132 of the light guide plate 13. Of course, the density of the color patterns 50 located on the light emission surface 132 increases with increasing distance from the light introduction surface 131 (or the light source module 20).

Figure 8:
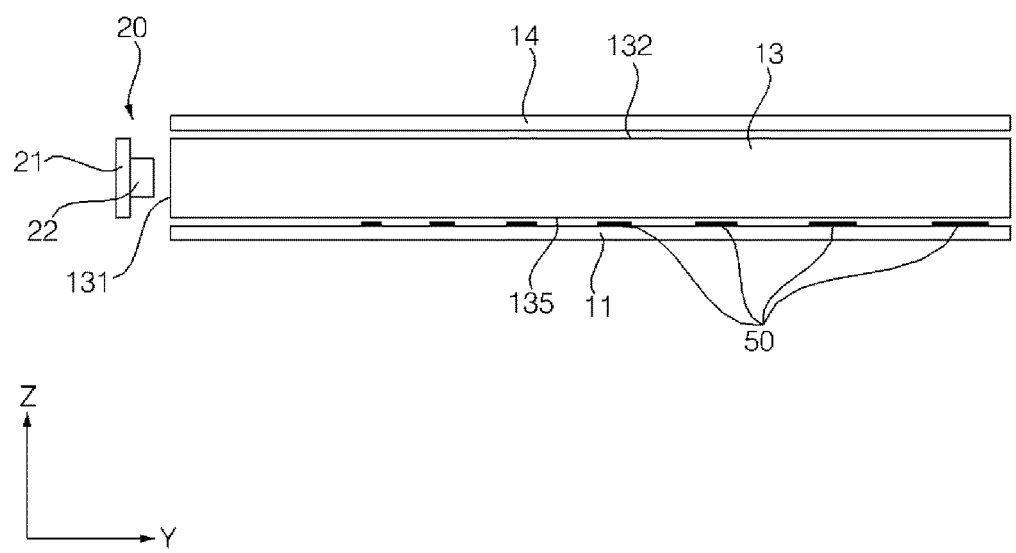
FIG. 8 is a sectional view illustrating the planar light source device according to a fifth embodiment.

FIG. 8 is a sectional view illustrating the planar light source device according to a fifth embodiment.

Referring to FIG. 8, the planar light source device of the fifth embodiment differs from that of the first embodiment in terms of the positions of the color patterns 0.

The color patterns 50 of the fifth embodiment are located on the reflector sheet 12. Specifically, the color patterns 50 of the fifth embodiment are located on the upper surface of the reflector sheet 12.

Of course, the density of the color patterns 50 located on the reflector sheet 12 increases with increasing distance from the light introduction surface 131 (or the light source module 20).

Figure 9:
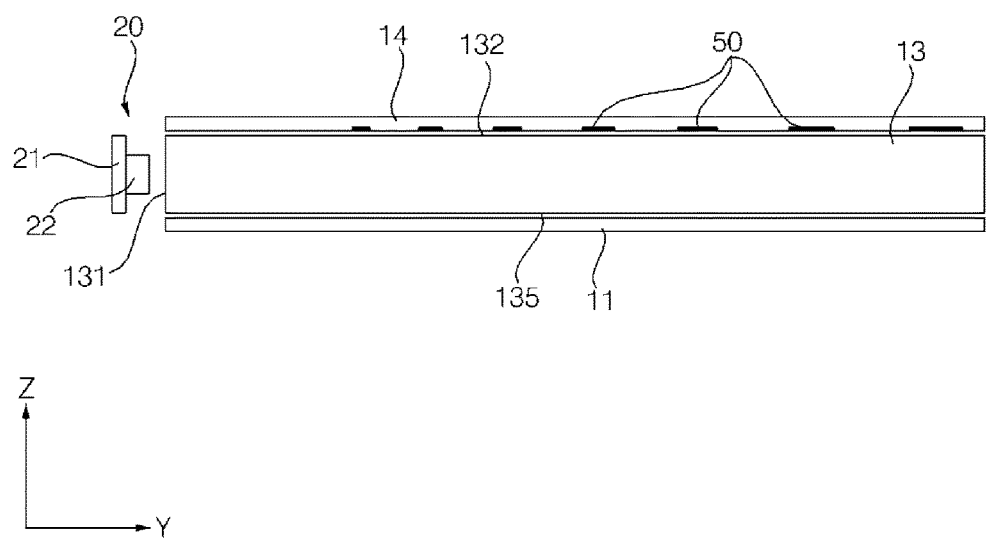
FIG. 9 is a sectional view illustrating the planar light source device according to a sixth embodiment.

FIG. 9 is a sectional view illustrating the planar light source device according to a sixth embodiment.

Referring to FIG. 9, the planar light source device of the sixth embodiment differs from that of the first embodiment in terms of the positions of the color patterns 50.

The color patterns 50 of the sixth embodiment are located on the optical sheet 14. Specifically, the color patterns 50 of the sixth embodiment are located on the lower surface of the optical sheet 14.

Of course, the density of the color patterns 50 located on the optical sheet 14 increases with increasing distance from the light introduction surface 131 (or the light source module 20).

Figure 10:
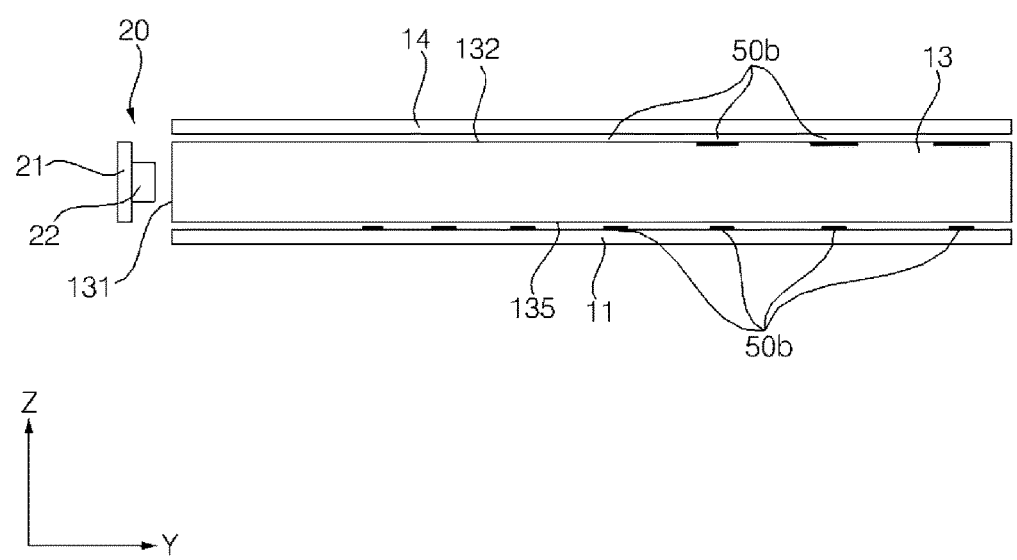
FIG. 10 is a sectional view illustrating the planar light source device according to a seventh embodiment.

FIG. 10 is a sectional view illustrating the planar light source device according to a seventh embodiment.

Referring to FIG. 10, the planar light source device of the fifth embodiment differs from that of the first embodiment in terms of the positions of the color patterns 50.

The color patterns 50 of the seventh embodiment are located on at least two of the reflector sheet 12, the light guide plate 13, and the optical sheet 14.

For example, as exemplarily illustrated in FIG. 10, the color patterns 50 are located on the light emission surface 132 of the light guide plate 13 and the reflector sheet 12. Of course, the density of the color patterns 50 located between the reflector sheet 12 and the light guide plate 13 increases with increasing distance from the light introduction surface 131 (or the light source module 20) when viewed from the front. Here, "density" may mean the sum of the area of the color patterns 50 on the reflector sheet 12 and the area of the color patterns 50 on the light guide plate 13 per unit area of the light emission surface 132.

Specifically, the color patterns 50 arranged on the reflector sheet 12 have the same size and the same pitch, and the color patterns 50 are arranged only in the region of the light emission surface 132 distant from the light introduction surface 131.

Figure 11:
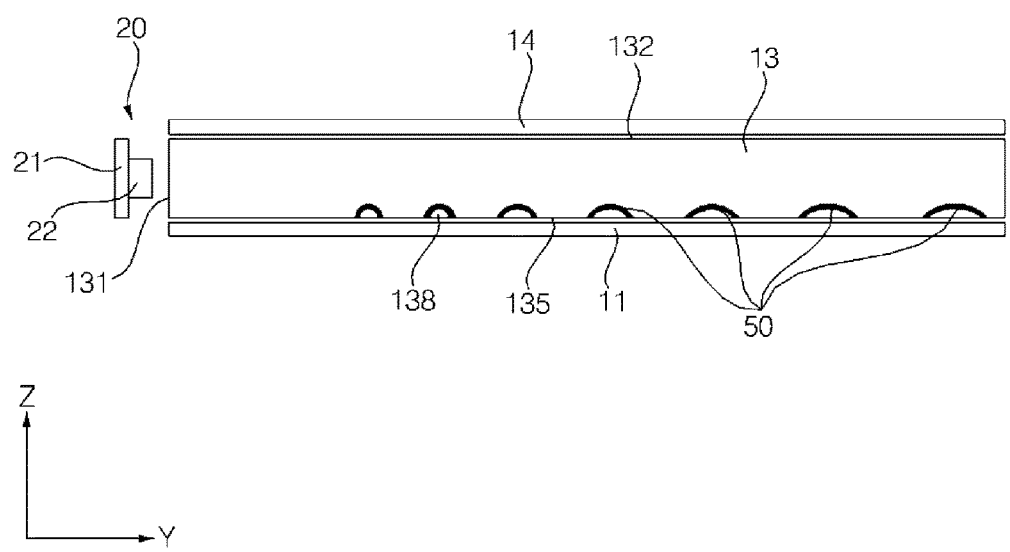
FIG. 11 is a sectional view illustrating the planar light source device according to an eighth embodiment.

FIG. 11 is a sectional view illustrating the planar light source device according to an eighth embodiment.

Referring to FIG. 11, the planar light source device of the eighth embodiment differs from that of the first embodiment in terms of the positions of the color patterns 50 and the shape of the light guide plate 13.

The rear surface 135 of the light guide plate 13 according to the eighth embodiment is formed with light-scattering patterns to scatter light. The light-scattering patterns are scattering bosses 138 protruding forward from the rear surface 135. The scattering bosses 138 are arranged in a random manner.

At this time, the color patterns 50 are arranged on the rear surface 135 of the light guide plate 13. In order to efficiently prevent color deviation, the color patterns 50 are formed on the scattering bosses 138 protruding from the rear surface 135.

Figure 12:
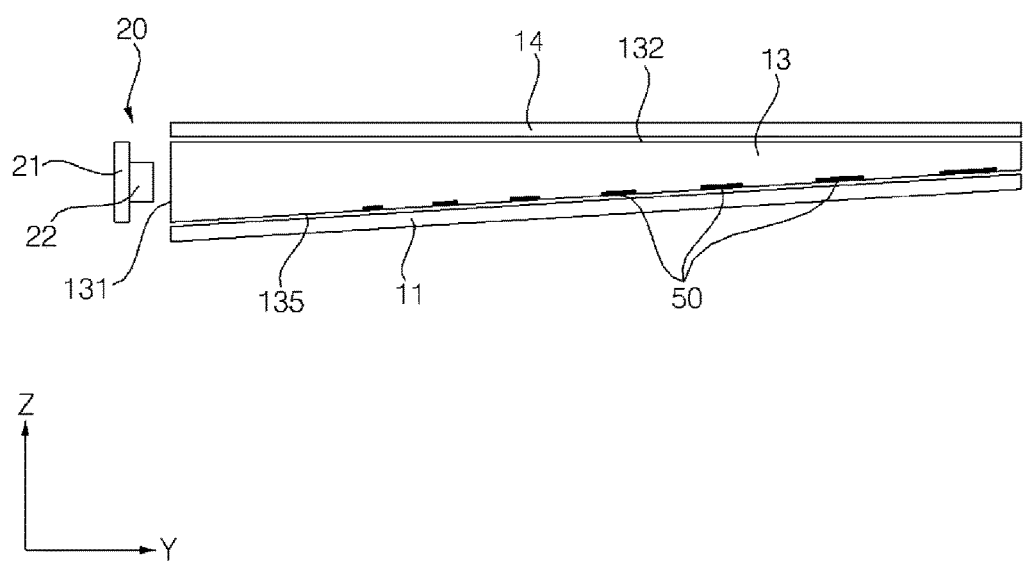
FIG. 12 is a sectional view illustrating the planar light source device according to a ninth embodiment.

FIG. 12 is a sectional view illustrating the planar light source device according to a ninth embodiment.

Referring to FIG. 12, the planar light source device of the ninth embodiment differs from that of the first embodiment in terms of the shape of the light guide plate 13.

The rear surface 135 of the light guide plate 13 according to the ninth embodiment is tilted increasingly upward with increasing distance from the light introduction surface 131. This may compensate for the decreased brightness of the light emission surface 132 distant from the light source module 20.

Figure 13:
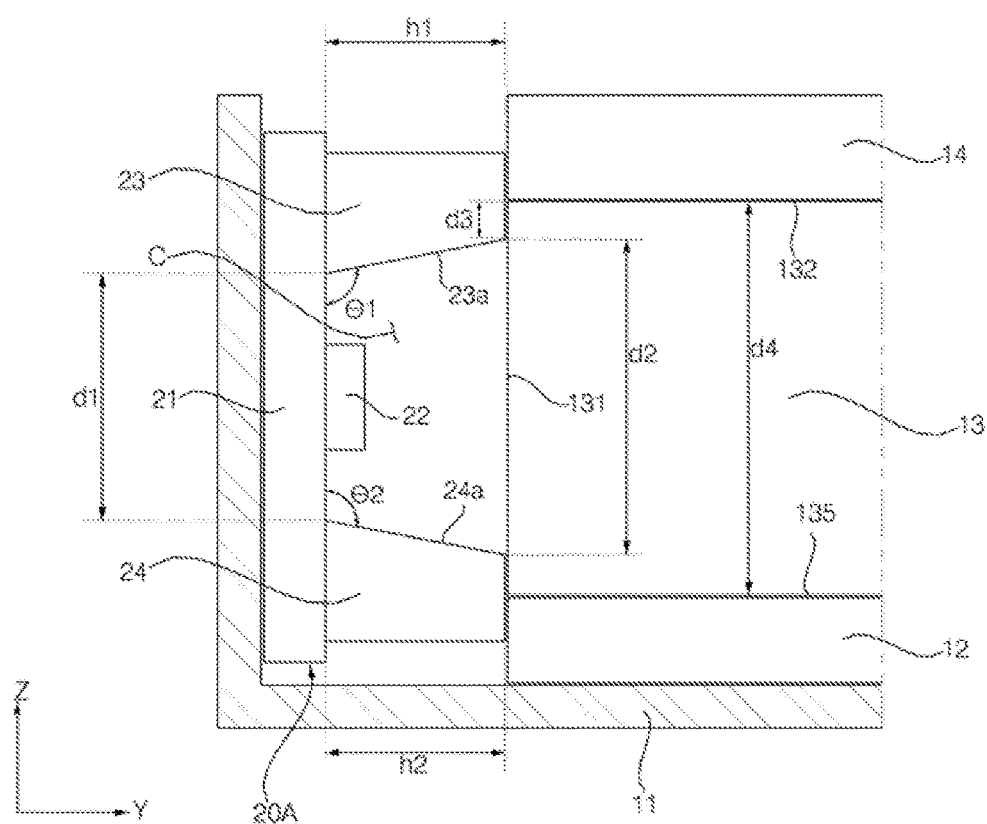
FIG. 13 is a sectional view illustrating the planar light source device according to a tenth embodiment.
Figure 14:
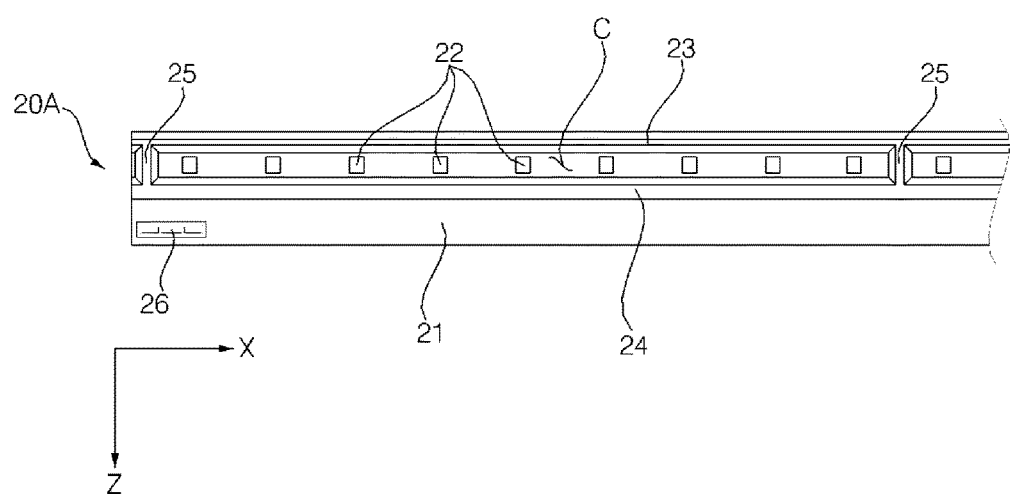
FIG. 14 is a plan view of a light source module illustrated in FIG. 13.

FIG. 13 is a sectional view illustrating the planar light source device according to a tenth embodiment, and FIG. 14 is a plan view of a light source module illustrated in FIG. 13.

Referring to FIGS. 13 and 14, the planar light source device 10A according to the tenth embodiment differs from that of the first embodiment in that the light source module further includes a light guide.

The light guide serves to guide light, emitted from the point light sources 22, from the circuit board 21 to the light introduction surface 131 of the light guide plate 13.

The light guide includes a first reflective wall 23 disposed on one surface of the circuit board 21, and a second reflective wall 24 disposed on the surface of the circuit board 21 so as to define a space C, in which the point light sources 22 are located, between the first reflective wall 23 and the second reflective wall 24. Here, the surface of the circuit board 21 is the surface facing the light introduction surface 131.

Specifically, when the Y-Z cross-section is viewed, the first reflective wall 23, the second reflective wall 24, the upper surface of the circuit board 21, and the light introduction surface 131 of the light guide plate 13 define a closed space, and the point light sources 22 are located in the closed space.

More specifically, the first reflective wall 23 and the second reflective wall 24 are arranged lengthwise in the longitudinal direction of the circuit board 21. The first reflective wall 23 and the second reflective wall 24 have a length corresponding to the length of the light introduction surface 131 and are arranged parallel to each other.

The first reflective wall 23 and the second reflective wall 24 support the light guide plate 13 to prevent the light guide plate 13 from coming into contact with the point light sources 22 and to maintain a distance between the point light sources 22 and the light guide plate 13. In addition, the first reflective wall 23 and the second reflective wall 24 reflect light introduced from the point light sources 22. The reflective walls may be formed of a resin material.

The first reflective wall 23 and the second reflective wall 24 cause the point light sources 22 and the light guide plate 13 to be spaced apart from each other, in order to prevent the light guide plate 13 from being deformed by heat generated from the point light sources 22. Thus, at least one of the heights h1 and h2 of the first reflective wall 23 and the second reflective wall 24 is greater than the height of the point light sources 22. Both the heights h1 and h2 of the first reflective wall 23 and the second reflective wall 24 may be greater than the height of the point light sources 22.

The light introduction surface 131 of the light guide plate 13 is supported by at least one of the first reflective wall 23 and the second reflective wall 24. Specifically, the front end of the light introduction surface 131 of the light guide plate 13 is supported by the first reflective wall 23, and the rear end of the light introduction surface 131 is supported by the second reflective wall 24. The width d3 of a portion of the light introduction surface 131 of the light guide plate 13, supported by the first reflective wall 23 or the second reflective wall 24, may exceed 0.01 mm.

The first reflective wall 23 and the second reflective wall 24 are formed with reflective surfaces to reflect light generated from the point light sources 22. The reflective surfaces may comprise at least one of silver (Ag), aluminum (Al), a silver (Ag) alloy, and an aluminum (Al) alloy. In another example, the reflective surfaces may be configured such that layers having different indices of refraction are alternately and repeatedly stacked one above another.

The reflective surfaces include a first reflective surface 23a formed on one surface of the first reflective wall 23 to reflect light, and a second reflective surface 24a formed on one surface of the second reflective wall 24 to reflect light.

The first reflective surface 23a and the second reflective surface 24a are arranged to face each other with the point light sources 22 interposed there between. The first reflective surface 23a and the second reflective surface 24a are parallel to each other. The space defined by the first reflective surface 23a and the second reflective surface 24a vertically covers the light introduction surface 131 of the light guide plate 13.

The reflective surfaces serve to increase the amount of light that undergoes total reflection at the boundary of the light guide plate 13 when light from the point light sources 22 is introduced into the light introduction surface 131 of the light guide plate 13. Accordingly, the light guide serves to cause the light to be introduced into the light introduction surface 131 in the direction parallel to the light emission surface 132 of the light guide plate 13, or to ensure a small angle between the light emission surface 132 and the light introduced into the light introduction surface 131.

Therefore, in particular, referring to FIG. 13, when the Y-Z cross section is viewed, the distance between the first reflective surface 23a and the second reflective surface 24a may increase in at least some region with increasing distance from the circuit board 21 and decreasing distance from the light introduction surface 131. Providing the reflective surfaces with the above-described shape may cause the light, generated from the point light sources 22, to be introduced into the light emission surface 131 of the light guide plate 13 in a direction approximately parallel to the light emission surface 132 of the light guide plate 13, which may reduce the loss of light inside the light guide plate 13.

The width d2 between the upper end of the first reflective surface 23a and the upper end of the second reflective surface 24a may be smaller than the width d4 of the light introduction surface 131 of the light guide plate 13. The width d2 between the upper end of the first reflective surface 23a and the upper end of the second reflective surface 24a may be within a range from 90% to 95% of the width d4 of the light introduction surface 131 of the light guide plate 13. When the width d2 between the upper end of the first reflective surface 23a and the upper end of the second reflective surface 24a is below 90% of the width d4 of the light introduction surface 131 of the light guide plate 13, hot spots may be generated on the light emission surface 132 at positions adjacent to the light introduction surface 131. When the width d2 between the upper end of the first reflective surface 23a and the upper end of the second reflective surface 24a exceeds 95% of the width d4 of the light introduction surface 131 of the light guide plate 13, the reflective walls 23 and 24 may have difficulty in supporting the light introduction surface 131 of the light guide plate 13.

In addition, the width d2 between the upper end of the first reflective surface 23a and the upper end of the second reflective surface 24a is greater than the width d1 between the lower end of the first reflective surface 23a and the lower end of the second reflective surface 24a.

The reflective surfaces may be flat surface or may be curved. In addition, the shapes of the first reflective surface 23a and the second reflective surface 24a may be symmetrical with each other, or may be different. The first reflective surface 23a and the second reflective surface 24a may be tilted relative to, or perpendicular to, the upper surface of the circuit board 21. At this time, the first reflective surface 23a and the second reflective surface 24a may have the same angle or different angles relative to the upper surface of the circuit board 21.

The light source module 20 further includes bridges 25 configured to connect the first reflective wall 23 and the second reflective wall 24 to each other.

The bridges 25 serve to prevent bending caused when the first reflective wall 23 and the second reflective wall 24 have long lengths, to maintain a constant distance between the first reflective wall 23 and the second reflective wall 24, thereby allowing the first reflective wall 23 and the second reflective wall 24 to be integrally coupled to the circuit board 21.

Each of the bridges 25 has one end connected to the first reflective wall 23, and the other end connected to the second reflective wall 24. The bridges 25 may be repeatedly arranged at a constant pitch in the longitudinal direction of the circuit board 21. The bridges 25 are located between the point light sources 22 arranged in the longitudinal direction of the circuit board 21.

Although the height of the bridges 25 is not limited, in order to allow the light generated from the point light sources 22 to be emitted in the longitudinal direction of the light introduction surface 131 without restriction, the height of the bridges 25 may be lower than those of the first reflective wall 23 and the second reflective wall 24.

In order to reflect the light introduced into the bridges 25, a reflective material to reflect light may be applied to the outer surfaces of the bridges 25. Here, the reflective material is the same material as the above-described reflector layer.

In addition, although the shape of the bridges 25 is not limited, each bridge 25 may be gradually reduced in width with increasing distance from the circuit board 21 and decreasing distance from the light guide plate 13.

Figure 15:
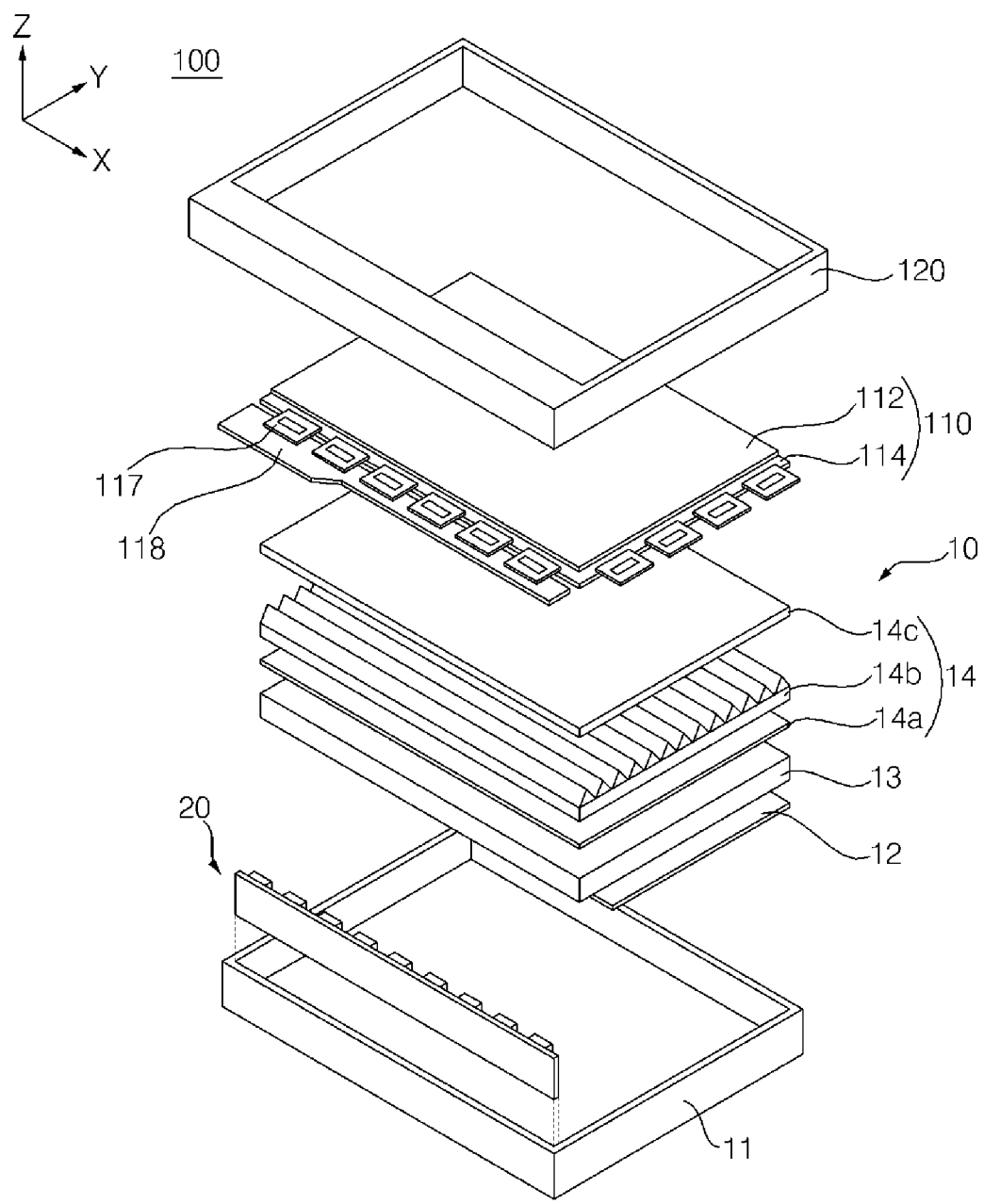
FIG. 15 is an exploded perspective view illustrating a liquid crystal display apparatus including the planar light source device.
Figure 16:
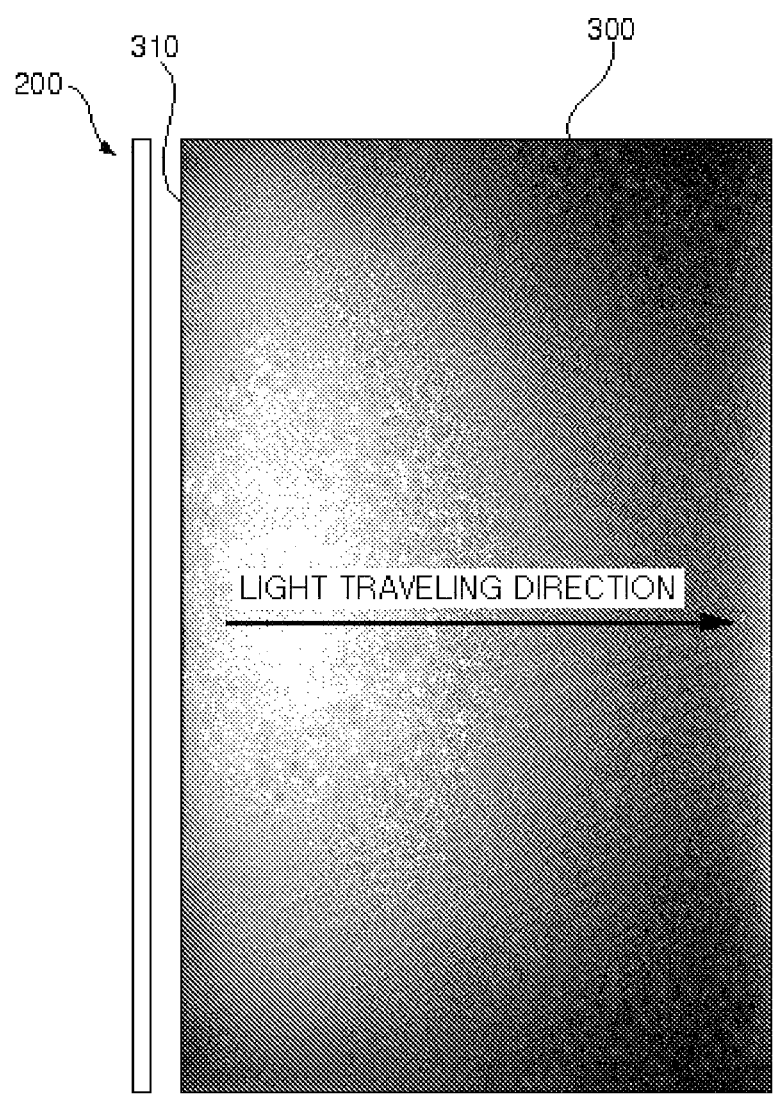
FIG. 16 is a plan view illustrating a planar light source device according to the related art.

FIG. 15 is an exploded perspective view illustrating a liquid crystal display apparatus including the planar light source device.

Referring to FIG. 15, the liquid crystal display apparatus 100 of the embodiment may include a liquid crystal display panel 110 which displays an image, and the planar light source device 10 which supplies light to the liquid crystal display panel 110.

The liquid crystal display panel 110 may display an image using the light provided from the planar light source device 10. The liquid crystal display panel 110 may include a color filter substrate 112 and a thin film transistor substrate 114 which are opposite to each other with liquid crystals interposed therebetween.

The color filter substrate 112 may realize the color of the image displayed on the liquid crystal display panel 110.

The thin film transistor substrate 114 is electrically connected to a printed circuit board 118, on which a plurality of circuit components is mounted, via a drive film 117. The thin film transistor substrate 114 may apply a drive voltage, provided from the printed circuit board 118, to the liquid crystals in response to a drive signal provided from the printed circuit board 118.

The thin film transistor substrate 114 may include thin film transistors and pixel electrodes formed on a transparent substrate formed of such as, for example, glass or plastic.

As such, through the use of the planar light source device 10 of the embodiment, the liquid crystal display apparatus 100 may achieve good light uniformity and may not cause hot spots at the edge portion thereof.

As is apparent from the above description, the embodiments provide an advantage of reducing the color deviation that occurs when light is absorbed by a liquid guide plate. In addition, the embodiments provide an advantage of improving the uniformity of light emitted from the light guide plate.

In addition, the embodiments enable a reduction in hot spots generated between point light sources of a light source module, which provides an advantage of improving the efficiency with which light from the light source module is introduced to the light guide plate.

Although embodiments have been described with reference to a number of illustrative embodiments thereof, it should be understood that numerous other modifications and applications may be devised by those skilled in the art that will fall within the intrinsic aspects of the embodiments. More particularly, various variations and modifications are possible in concrete constituent elements of the embodiments. In addition, it is to be understood that differences relevant to the variations and modifications fall within the spirit and scope of the present disclosure defined in the appended claims.

What is claimed is:

1. A planar light source device comprising:
   a light source configured to provide light;
   a light guide plate including a light introduction surface configured to receive the light supplied from the light source and a light emission surface configured to emit the light outward, the light emission surface having a larger area than the light introduction surface; and
   a plurality of color patterns configured to convert a wavelength of introduced light and to provide the light to the light guide plate,
   further comprising a reflector sheet disposed at the rear of the light guide plate, the reflector sheet being configured to reflect light directed from the light guide plate toward the light emission surface,
   wherein the color patterns are located on the reflector sheet and the light emission surface of the light guide plate,
   wherein the light guide plate is formed of a material that transmits light and absorbs light in a prescribed absorption wavelength band, and wherein the color patterns are configured to convert the light supplied from the light source into the light in the absorption wavelength band, wherein the color patterns located on the light emission surface increase in density with increasing distance from the light introduction surface, wherein the color patterns arranged on the reflector sheet have the same size, the color patterns arranged on the light emission surface are arranged only in a first region of the light emission surface distant from the light introduction surface, the color patterns arranged on the reflector sheet are arranged only in a second region of the light emission surface distant from the light introduction surface, wherein a distance between the first region and the light introduction surface is greater than a distance between the second region and the light introduction surface.

2. The device according to claim 1, wherein the light guide plate is formed of glass, and the color patterns include phosphors configured to convert the light provided from the light guide plate into light in a blue range and to provide the converted light to the light guide plate.

3. The device according to claim 1, wherein the light guide plate further includes a rear surface disposed to face and correspond to the light emission surface, wherein the color patterns are formed on the rear surface.

4. The device according to claim 3, wherein the rear surface of the light guide plate is tilted increasingly upward with increasing distance from the light introduction surface.

5. The device according to claim 1, wherein the light source is located adjacent to the light introduction surface, and wherein the color patterns increase in size with increasing distance from the light introduction surface.

* * * * *